(12) United States Patent
Nakatsuka et al.

(10) Patent No.: US 11,155,250 B2
(45) Date of Patent: Oct. 26, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Masayuki Nakatsuka, Wako (JP); Hiroshi Furumi, Wako (JP); Yasuaki Gunji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 362 days.

(21) Appl. No.: 16/421,508

(22) Filed: May 24, 2019

(65) Prior Publication Data
US 2019/0375382 A1 Dec. 12, 2019

(30) Foreign Application Priority Data
Jun. 7, 2018 (JP) .............................. JP2018-109825

(51) Int. Cl.
*B60T 7/22* (2006.01)
*B60W 10/18* (2012.01)
(Continued)

(52) U.S. Cl.
CPC ............... *B60T 7/22* (2013.01); *B60W 10/18* (2013.01); *B60W 30/09* (2013.01);
(Continued)

(58) Field of Classification Search
CPC .......... B60T 2201/022; B60T 2210/20; B60T 2220/00; B60T 2220/02; B60T 7/14; B60T 7/22; B60W 10/18; B60W 2540/12; B60W 2540/22; B60W 2554/40; B60W 30/09; B60W 30/0956; B60W 30/18109;
(Continued)

(56) References Cited

U.S. PATENT DOCUMENTS 9,487,139 B1* 11/2016 Ishida .................... B60W 30/08
2014/0309812 A1* 10/2014 Lee ........................ B60W 50/14
701/2

(Continued)

FOREIGN PATENT DOCUMENTS

JP 2009-214764 9/2009

*Primary Examiner* — Babar Sarwar
(74) *Attorney, Agent, or Firm* — Amin, Turocy & Watson, LLP

(57) ABSTRACT

A vehicle control device includes: an obstacle recognizing unit; a state recognizing unit; an operation detecting unit; a braking force control unit that performs automated brake control of outputting a braking force by operating a brake device in a case in which a relation between the obstacle recognized and the vehicle satisfies a predetermined condition; and a stopping control unit that causes the braking force control unit to stop the automated brake control in a case in which a driving operation of a predetermined level or more using the operator is detected from a time that is a predetermined time before start of the automated brake control to a time at which the automated brake control starts, wherein the stopping control unit does not perform the stopping of the automated brake control in a case in which the state of the driver is recognized as a predetermined state.

18 Claims, 11 Drawing Sheets

(51) Int. Cl.
*B60W 40/09* (2012.01)
*B60W 30/095* (2012.01)
*G06K 9/00* (2006.01)
*B60W 30/09* (2012.01)

(52) U.S. Cl.
CPC ........ *B60W 30/0956* (2013.01); *B60W 40/09* (2013.01); *G06K 9/00805* (2013.01)

(58) Field of Classification Search
CPC ............ B60W 30/18154; B60W 40/09; G06K 9/00805; G06K 9/00845
See application file for complete search history.

(56) References Cited

U.S. PATENT DOCUMENTS

| | | | |
|---|---|---|---|
| 2016/0001781 A1* | 1/2016 | Fung | B60K 28/02 |
| | | | 701/36 |
| 2016/0114799 A1* | 4/2016 | Kawasaki | B60W 10/04 |
| | | | 701/70 |
| 2017/0197617 A1* | 7/2017 | Penilla | G08G 1/0112 |
| 2017/0217429 A1* | 8/2017 | Shioe | B60W 10/182 |
| 2018/0075309 A1* | 3/2018 | Sathyanarayana | G05D 1/0055 |
| 2018/0276485 A1* | 9/2018 | Heck | G06N 7/005 |
| 2018/0290650 A1* | 10/2018 | Ryne | B60W 30/09 |
| 2018/0326990 A1* | 11/2018 | Kusaka | B60W 10/18 |
| 2019/0023208 A1* | 1/2019 | Boston | G06K 9/00308 |
| 2019/0027039 A1* | 1/2019 | Takae | G08G 1/00 |
| 2019/0315347 A1* | 10/2019 | Ike | B60W 30/08 |
| 2021/0179117 A1* | 6/2021 | Glazman | H04S 7/303 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-109825, filed Jun. 7, 2018, the content of which is incorporated herein by reference.

BACKGROUND

Field of the Invention

The present invention relates to a vehicle control device, a vehicle control method, and a storage medium.

Description of Related Art

Conventionally, technologies for supporting a driving operation of a driver of a vehicle are known. In relation with this, an automated brake device that detects obstacles in the vicinity of a vehicle and operates an automated brake in a case in which it is determined that there is a likelihood of collision with a detected obstacle is known (for example, Japanese Unexamined Patent Application Publication No. 2009-214764). This automated brake device stops the operation of the automated brake when an intention of stopping braking such as an acceleration operation of a driver is detected.

SUMMARY

However, in the conventional technology, when a driver erroneously operates an accelerator when approach of an obstacle has been recognized, there are cases in which, unintentionally, the operation of the automated brake is stopped, or the automated brake is not operated, and accordingly, there are cases in which appropriate drive control is not performed.

An aspect of the present invention is realized in consideration of such situations, and one object thereof is to provide a vehicle control device, a vehicle control method, and a storage medium capable of executing more appropriate drive control on the basis of surrounding situations and the state of a driver.

A vehicle control device, a vehicle control method, and a storage medium according to the present invention employ the following configurations.

(1): A vehicle control device according to one aspect of the present invention is a vehicle control device including: an obstacle recognizing unit that recognizes an obstacle in the vicinity of a vehicle; a state recognizing unit that recognizes a state of a driver of the vehicle; an operation detecting unit that detects an operation of the driver on an operator accepting a driving operation for a driving force output device that can output a driving force used for running of the vehicle; a braking force control unit that performs automated brake control of outputting a braking force by operating a brake device that can output a braking force for the vehicle in a case in which a relation between the obstacle recognized by the obstacle recognizing unit and the vehicle satisfies a predetermined condition; and a stopping control unit that causes the braking force control unit to stop the automated brake control in a case in which a driving operation of a predetermined level or more using the operator is detected by the operation detecting unit from a time that is a predetermined time before start of the automated brake control using the braking force control unit to a time at which the automated brake control starts, wherein the stopping control unit does not perform the stopping of the automated brake control in a case in which the state of the driver is recognized as a predetermined state by the state recognizing unit.

(2): A vehicle control device according to one aspect of the present invention is a vehicle control device including: an obstacle recognizing unit that recognizes an obstacle in the vicinity of a vehicle; a state recognizing unit that recognizes a state of a driver of the vehicle; an operation detecting unit that detects an operation of the driver on an operator accepting a driving operation for a driving force output device that can output a driving force used for running of the vehicle; a braking force control unit that performs automated brake control of outputting a braking force by operating a brake device that can output a braking force for the vehicle in a case in which a relation between the obstacle recognized by the obstacle recognizing unit and the vehicle satisfies a predetermined condition; and a stopping control unit that causes the braking force control unit to stop the automated brake control in a case in which a driving operation of a predetermined level or more using the operator is detected by the operation detecting unit from a time that is a predetermined time before start of the automated brake control using the braking force control unit to a time at which the automated brake control starts, wherein the stopping control unit stops the automated brake control in a case in which the state of the driver is not recognized as a predetermined state by the state recognizing unit.

(3): In the aspect (1) or (2) described above, the stopping control unit may cause the braking force control unit to stop the automated brake control in a case in which a driving operation of a predetermined level or more using the operator is detected by the operation detecting unit after the automated brake control is started by the braking force control unit.

(4): In the aspect (1) or (2) described above, the stopping control unit may not perform the stopping of the automated brake control in a case in which the state of the driver is recognized as a predetermined state by the state recognizing unit before the automated brake control is started and in a case in which a driving operation of a predetermined level or more using the operator is detected by the operation detecting unit after the automated brake control is started.

(5): In the aspect (1) or (2) described above, the stopping control unit causes the braking force control unit to stop the automated brake control in a case in which the state of the driver is recognized as a predetermined state by the state recognizing unit after the automated brake control is started, and a driving operation of a predetermined level or more using the operator is detected by the operation detecting unit.

(6): In the aspect (1) or (2) described above, a driver imaging unit that images the driver is further included, wherein the state recognizer recognizes a facial expression of the driver from an image captured by the driver imaging unit and recognizes the state of the driver on the basis of the recognized facial expression.

(7): In the aspect (6) described above, the state recognizing unit classifies patterns of facial expressions recognized using images captured by the driver imaging unit and recognizes the state of the driver on the basis of the classified patterns of the facial expressions.

(8): In the aspect (6) described above, a storage unit that stores learning data associating a facial expression and a state with each other for each driver is further included, wherein the state recognizing unit identifies a driver of the vehicle from images captured by the driver imaging unit and recognizes a state of the identified driver by collating a facial expression of the identified driver with the learning data stored in the storage unit.

(9): In the aspect (1) or (2) described above, a biological information detecting unit that detects biological information of the driver is further included, wherein the state recognizing unit recognizes the state of the driver on the basis of the biological information detected by the biological information detecting unit.

(10): A vehicle control method according to one aspect of the present invention is a vehicle control method using a vehicle control device, the vehicle control method including: recognizing an obstacle in the vicinity of a vehicle; recognizing a state of a driver of the vehicle; detecting an operation of the driver on an operator accepting a driving operation for a driving force output device that can output a driving force used for running of the vehicle; performing automated brake control of outputting a braking force by operating a brake device that can output a braking force for the vehicle in a case in which a relation between the recognized obstacle and the vehicle satisfies a predetermined condition; and stopping the automated brake control in a case in which a driving operation of a predetermined level or more using the operator is detected from a time that is a predetermined time before start of the automated brake control to a time at which the automated brake control starts and not performing the stopping of the automated brake control in a case in which the state of the driver is recognized as a predetermined state.

(11): A computer-readable non-transitory storage medium is a computer-readable non-transitory storage medium having a program stored thereon, the program causing the vehicle control device to execute: recognizing an obstacle in the vicinity of a vehicle; recognizing a state of a driver of the vehicle; detecting an operation of the driver on an operator accepting a driving operation for a driving force output device that can output a driving force used for running of the vehicle; performing automated brake control of outputting a braking force by operating a brake device that can output a braking force for the vehicle in a case in which a relation between the recognized obstacle and the vehicle satisfies a predetermined condition; and stopping the automated brake control in a case in which a driving operation of a predetermined level or more using the operator is detected from a time that is a predetermined time before start of the automated brake control to a time at which the automated brake control starts and not performing the stopping of the automated brake control in a case in which the state of the driver is recognized as a predetermined state.

According to the aspects (1) to (11) described above, more appropriate drive control can be executed on the basis of surrounding situations and the state of a driver.

DESCRIPTION OF EMBODIMENTS

Hereinafter, a vehicle control device, a vehicle control method, and a storage medium according to an embodiment of the present invention will be described with reference to the drawings. Hereinafter, although a case in which left-side traffic regulations are applied will be described, the left side and the right side may be interchanged in a case in which a rule of right-side traffic is applied.

[Entire Configuration]

Figure 1:
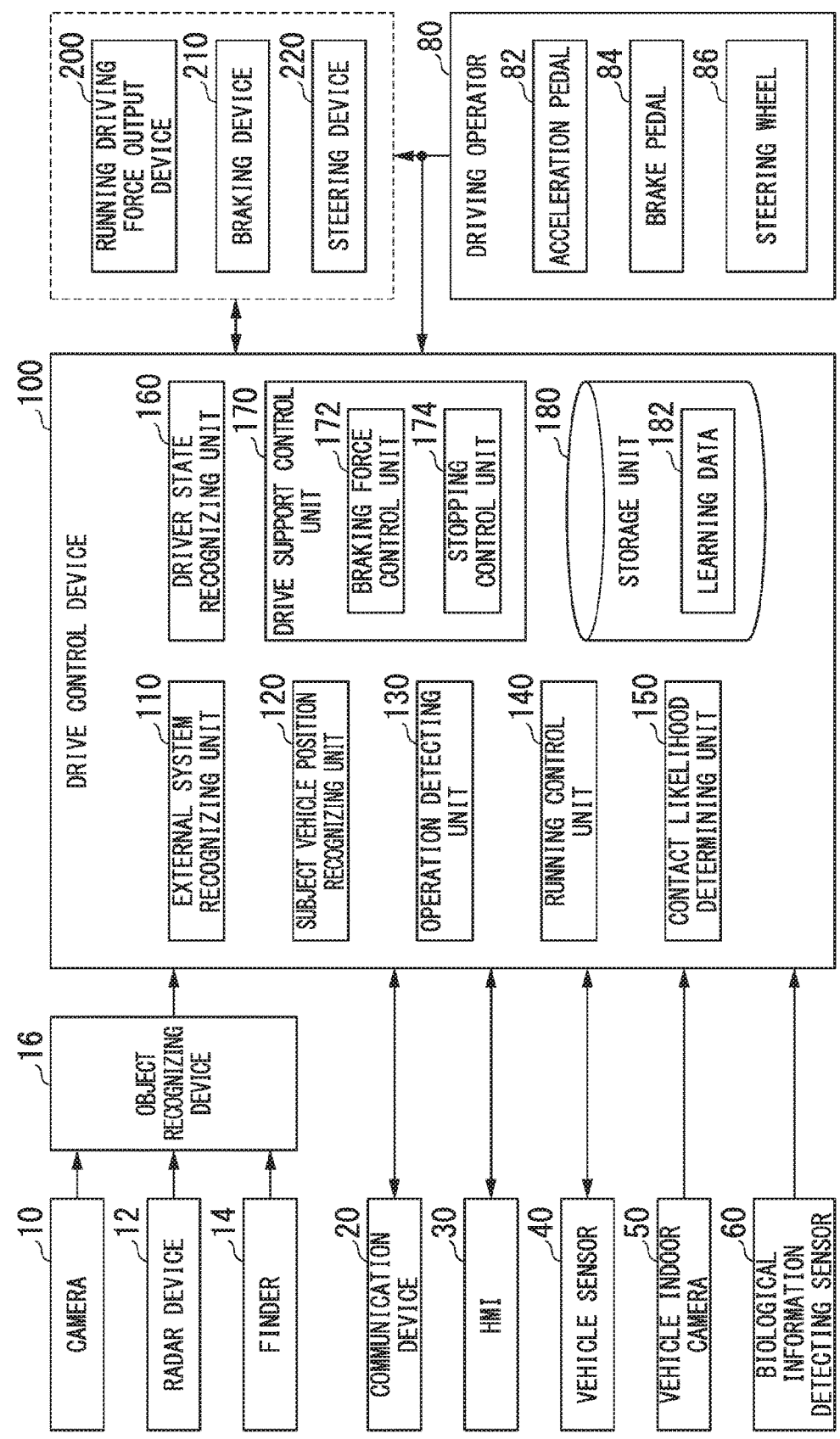
FIG. 1 is a configuration diagram of a vehicle system using a vehicle control device according to an embodiment.

FIG. 1 is a configuration diagram of a vehicle system 1 using a vehicle control device according to an embodiment. A vehicle in which the vehicle system 1 is mounted is, for example, a vehicle having two wheels, three wheels, four wheels, or the like, and a driving source thereof is an internal combustion engine such as a diesel engine or a gasoline engine, an electric motor, or a combination thereof. The electric motor operates using power generated using a power generator connected to an internal combustion engine or power discharged from a secondary cell or a fuel cell.

The vehicle system 1, for example, includes a camera 10, a radar device 12, a finder 14, an object recognizing device 16, a communication device 20, a human machine interface (HMI) 30, a vehicle sensor 40, a vehicle indoor camera 50, a biological information detecting sensor 60, a driving operator 80, a drive control device 100, a running driving force output device 200, a brake device 210, and a steering device 220. Such devices and units are interconnected using a multiplex communication line such as a controller area network (CAN) communication line, a serial communication line, a radio communication network, or the like. The configuration shown in FIG. 1 is merely one example, and thus parts of the configuration may be omitted or other additional components may be added. A combination of the vehicle indoor camera 50, the biological information detecting sensor 60, and the drive control device 100 is one example of a "vehicle control device." The vehicle indoor camera 50 is one example of a "driver imaging unit." The biological information detecting sensor 60 is one example of a "biological information detecting unit."

The camera 10, for example, is a digital camera using a solid-state imaging device such as a charge coupled device (CCD) or a complementary metal oxide semiconductor (CMOS). The camera 10 is installed at an arbitrary place on a vehicle in which the vehicle system 1 is mounted (hereinafter referred to as a subject vehicle M). In the case of forward imaging, the camera 10 is installed on an upper part of a front windshield, a rear face of a rear-view mirror, or the like. The camera 10, for example, repeatedly images the vicinity of the subject vehicle M periodically. The camera 10 may be a stereo camera.

The radar device 12 emits radio waves such as millimeter waves to the vicinity of the subject vehicle M and detects at least a position of (a distance to and an azimuth of) an object by detecting radio waves (reflected waves) reflected by the object. The radar device 12 is installed at an arbitrary place on the subject vehicle M. The radar device 12 may detect a position and a speed of an object using a frequency modulated continuous wave (FM-CW) system.

The finder 14 is a light detection and ranging (LIDAR) device. The finder 14 emits light to the vicinity of the subject vehicle M and measures scattered light. The finder 14 detects a distance with respect to a target on the basis of a time from light emission to light reception. The emitted light, for example, is pulse-form laser light. The finder 14 is mounted at an arbitrary position on the subject vehicle M.

The object recognizing device 16 may perform a sensor fusion process on results of detection using some or all of the camera 10, the radar device 12, and the finder 14, thereby allowing recognition of a position, a type, a speed, and the like of an object. The object recognizing device 16 outputs a result of recognition to the drive control device 100. The object recognizing device 16 may output results of detection using the camera 10, the radar device 12, and the finder 14 to the drive control device 100 as they are. The object recognizing device 16 may be omitted from the vehicle system 1. The camera 10 includes an infrared camera imaging changes in the surface temperature of an object in addition to a camera imaging a general image. Switching between general imaging and infrared imaging may be performed using functions included in the camera 10.

The communication device 20, for example, communicates with other vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to an occupant of the subject vehicle M and receives an input operation performed by a vehicle occupant. The HMI 30 includes various display devices, a speaker, a buzzer, a touch panel, switches, keys, light emitting devices disposed inside a vehicle cabin, and the like. In the HMI 30, for example, a switch accepting a setting of a target speed at the time of running of the subject vehicle M according to a vehicle occupant for starting or ending control relating to predetermined drive support and the like are included. Some components of the HMI 30 may be disposed in the driving operator 80 (for example, a steering wheel 86).

The vehicle sensor 40 includes a vehicle speed sensor that detects a speed of the subject vehicle M, an acceleration sensor that detects an acceleration, a yaw rate sensor that detects an angular velocity around a vertical axis, an azimuth sensor that detects the azimuth of the subject vehicle M, and the like. The acceleration, for example, includes at least one of a vertical acceleration relating to the advancement direction of the subject vehicle M and a horizontal acceleration relating to the horizontal direction of the subject vehicle M.

The vehicle indoor camera 50, for example, captures an image including a face of a vehicle occupant sitting on a seat disposed inside the vehicle cabin of the subject vehicle M. A vehicle occupant, for example, is a vehicle occupant sitting on a driver's seat (hereinafter, referred to as a driver) and may additionally include a vehicle occupant (passenger) sitting on an assistant driver's seat or a rear seat. The vehicle indoor camera 50, for example, is a digital camera using a solid-state imaging device such as a charge coupled device (CCD) or a complementary metal oxide semiconductor (CMOS). The vehicle indoor camera 50, for example, images a vehicle occupant at a predetermined timing. The image captured by the vehicle indoor camera 50 is output to the drive control device 100.

The biological information detecting sensor 60 detects biological information of a driver. The biological information detecting sensor 60, for example, includes a heartbeat sensor, a perspiration sensor, a myoelectric sensor, a brain wave sensor, and a brain bloodstream sensor. The heartbeat sensor or the perspiration sensor, for example are disposed in the steering wheel 86 and, when a driver grips the steering wheel 86 during driving, a heart rate is detected using the heart beat sensor, and the amount of perspiration is detected using the perspiration sensor. The heartbeat sensor may be disposed in a seat on which a driver sits. The myoelectric sensor, the brain wave sensor, and the brain bloodstream sensor are disposed at a predetermined part (for example, the head or a skin) of a driver to be detachably attached. The myoelectric sensor detects a change in a weak electric field generated in muscles of a driver during driving. The brain wave sensor detects brain waves of a driver during driving. The brain bloodstream sensor detects a change in the bloodstream of the brain of a driver during driving. The brain bloodstream sensor may be a non-contact sensor that includes a light source emitting predetermined light to the surface of the head and a light receiving sensor receiving the emitted light.

The driving operator 80, for example, includes an acceleration pedal 82, a brake pedal 84, and a steering wheel 86. The driving operator 80 may include a shift lever, a steering wheel variant, a joystick, and other operators. A sensor detecting the amount of an operation or the presence/absence of an operation is installed in the driving operator 80, and a result of the detection is output to the automated drive control device 100 or some or all of the running driving force output device 200, the brake device 210, and the steering device 220. For example, an acceleration opening degree sensor that accepts an acceleration instruction for the subject vehicle M from a driver is installed in the acceleration pedal 82, and the amount of operation of the acceleration pedal 82 (a degree of opening of acceleration) is detected using the acceleration opening degree sensor. A brake depression amount sensor that accepts a deceleration or stopping of the subject vehicle M from a driver is installed in the brake pedal 84, and the amount of operation of the brake pedal 84 (the amount of depression of the brake) is detected using the brake depression amount sensor. A steering sensor that accepts a steering instruction for the subject vehicle M from a driver is installed in the steering wheel 86, and the amount of operation of the steering wheel 86 (a control amount of a steering angle or a steering torque) is detected using the steering sensor.

Before description of the drive control device 100, the running driving force output device 200, the brake device 210, and the steering device 220 will be described. The running driving force output device 200 outputs a running driving force (torque) used for the subject vehicle M to run to driving wheels. For example, the running driving force output device 200 includes a combination of an internal combustion engine, an electric motor, a transmission, and the like and a power electronic control unit (ECU) controlling these. The power ECU controls the components described above in accordance with information input from the drive control device 100 or information input from the acceleration pedal 82.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of information (a brake pressure) input from the drive control device 100 or information (an amount of brake depression) input from the brake pedal 84 such that a braking force (brake torque) corresponding to a braking operation is output to each vehicle wheel. The brake device 210 may include a mechanism that delivers a hydraulic pressure generated in accordance with an operation for the brake pedal 84 to the cylinder through a master cylinder as a backup. In addition, the brake device 210 is not limited to the configuration described above and may be an electronic control-type hydraulic brake device that delivers a hydraulic pressure of the master cylinder to the cylinder and outputs a braking force to each vehicle wheel by controlling an actuator on the basis of information input from the drive control device 100.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the drive control device 100 or information input from the steering wheel 86.

[Functions of Drive Control Device]

The drive control device 100, for example, includes an external system recognizing unit 110, a subject vehicle position recognizing unit 120, an operation detecting unit 130, a running control unit 140, a contact likelihood determining unit 150, a driver state recognizing unit 160, a drive support control unit 170, and a storage unit 180. Each of the constituent elements except for the storage unit 180, for example, is realized by a hardware processor such as a central processing unit (CPU) executing a program (software). In addition, some or all of such constituent elements may be realized by hardware (a circuit unit; includes circuitry) such as a large scale integration (LSI), an application specific integrated circuit (ASIC), a field-programmable gate array (FPGA), a graphics processing unit (GPU), or the like or may be realized by cooperation between software and hardware. The program may be stored in the storage unit 180 of the drive control device 100 in advance or may be stored in a storage medium that can be loaded or unloaded such as a DVD or a CD-ROM and be installed in the storage unit 180 of the drive control device 100 by loading the storage medium into a drive device (not shown in the drawing). The external system recognizing unit 110 is one example of an "obstacle recognizing unit." The driver state recognizing unit 160 is one example of a "state recognizing unit."

The external system recognizing unit 110 recognizes surrounding situations of the subject vehicle M on the basis of information input from the camera 10, the radar device 12, and the finder 14 through the object recognizing device 16. More specifically, the external system recognizing unit 110 recognizes states such as positions, speeds, accelerations, and the like of objects present in the vicinity of the subject vehicle M. The objects, for example, include moving objects such as traffic participants and other vehicles and obstacles such as a guard rail, an electricity pole, and a construction site. The traffic participants, for example, include pedestrians and bicycles. The position of an object, for example, is recognized as a position in an absolute coordinate system having a representative point (the center of gravity, the center of a driving shaft, or the like) of the subject vehicle M as its origin and is used for control. The position of an object may be represented as a representative point such as the center of gravity or a corner of the object or may be represented in a representative area. In a case in which an object is another vehicle, a "state" of the object may include an acceleration, a jerk, or an "action state" (for example, whether or not the object is changing lanes or is to change lanes) of the object. On the other hand, in a case in which an object is a pedestrian, a "state" of the object may include a direction in which the object moves or an "action state" (for example, the object is crossing a road or whether or not the object is to cross a road).

The external system recognizing unit 110 recognizes road environments (for example, a road shape, a road slope, a curved road, an intersection, traffic lights, and a median strip) and the like in the vicinity of the subject vehicle M on the basis of information input from the camera 10, the radar device 12, and the finder 14 through the object recognizing device 16. The external system recognizing unit 110 may refer to map information (not shown in the drawing) stored in the storage unit 180 or the like on the basis of the position information of the subject vehicle M that is recognized by the subject vehicle position recognizing unit 120 and acquire information of road environments associated with the position information.

The subject vehicle position recognizing unit 120 identifies a position of the subject vehicle M on the basis of signals received from GNSS satellites by a global navigation satellite system (GNSS) receiver (not shown in the drawing). The position of the subject vehicle M may be identified or complemented by an inertial navigation system (INS) using an output of the vehicle sensor 40. The subject vehicle position recognizing unit 120, for example, recognizes a lane (running lane) in which the subject vehicle M is running and a relative position and a posture of the subject vehicle M with respect to the running lane. The subject vehicle position recognizing unit 120, for example, recognizes partition lines of a road from an image captured by the camera 10 and recognizes a lane partitioned off by two partition lines closest to the subject vehicle M among recognized partition lines as a running lane (own lane). Then, the subject vehicle position recognizing unit 120 recognizes a position and a posture of the subject vehicle M with respect to the recognized running lane.

Then, the subject vehicle position recognizing unit 120 recognizes a deviation of a reference point (for example, the center of gravity) of the subject vehicle M from the center of the running lane and an angle formed in the advancement direction of the subject vehicle M with respect to a line acquired by extending the center of the running lane as a relative position and a posture of the subject vehicle M with respect to the running lane. Instead of this, the subject vehicle position recognizing unit 120 may recognize a position of the reference point of the subject vehicle M with respect to one side end portion of the running lane or the like as a relative position of the subject vehicle M with respect to the running lane.

The subject vehicle position recognizing unit 120 may recognize a relative distance and a relative speed between the subject vehicle M and another vehicle or any other object on the basis of the position and the speed of the subject vehicle M that have been recognized and the position and the speed of another vehicle or any other object recognized by the external system recognizing unit 110.

The subject vehicle position recognizing unit 120, for example, may recognize an adjacent lane that is adjacent to the own lane. For example, the subject vehicle position recognizing unit 120 may recognize an area between a partition line that is closest to the subject vehicle M after the partition lines of the own lane and a partition line of the own lane as an adjacent lane.

The operation detecting unit 130 detects a driver's operation on the driving operator 80. For example, the operation detecting unit 130 detects an acceleration operation of a predetermined acceleration opening degree or more for the acceleration pedal 82, a braking operation of a predetermined depression amount or more for the brake pedal 84, and a steering operation of a predetermined steering angle or more for the steering wheel 86. The operation detecting unit 130 may detect a driver's operation in a case in which the acceleration operation, the braking operation, or the steering operation described above has been detected continuously for a predetermined time or more.

The running control unit 140 controls running of the subject vehicle M by operating the running driving force output device 200, the brake device 210 and the steering device 220 on the basis of a driver's operation on the driving operator 80 that is detected by the operation detecting unit 130.

Figure 2:
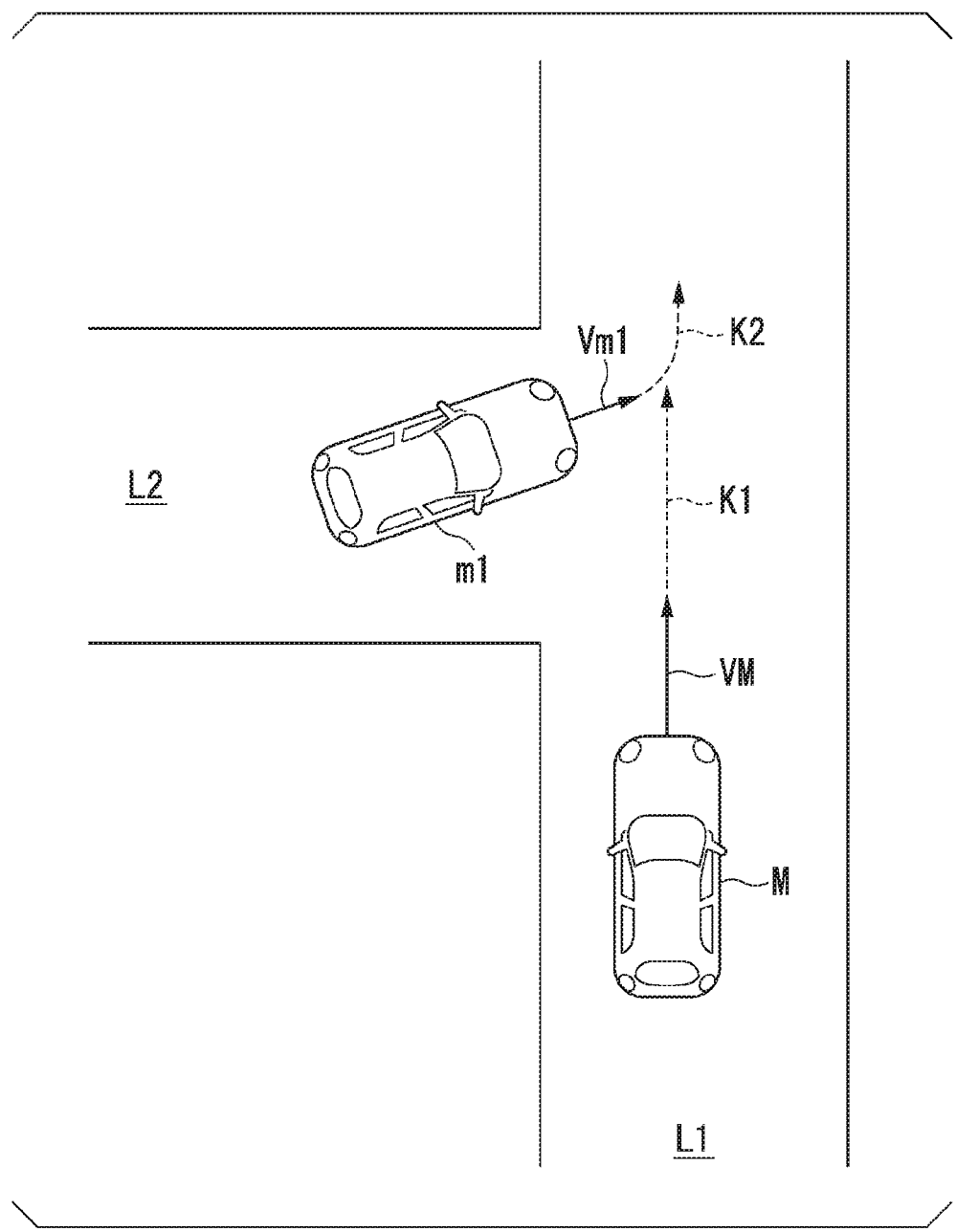
FIG. 2 is a diagram showing a process of a contact likelihood determining unit.

The contact likelihood determining unit 150 recognizes whether or not there is a likelihood of contact between an obstacle recognized by the external system recognizing unit 110 and the subject vehicle M. For example, the contact likelihood determining unit 150 may comprehensively determine whether there is a likelihood of coming in contact with an obstacle on the basis of elements such as the position and the vehicle speed of the subject vehicle M, a distance of the subject vehicle M from an obstacle, and a position, a speed, a predicted movement locus, and the like of the obstacle. FIG. 2 is a diagram showing the process of the contact likelihood determining unit 150. In the example shown in FIG. 2, it is assumed that the subject vehicle M is running in a lane L1 at a vehicle speed VM, and another vehicle m1 that is one example of the obstacle is making a left turn from a lane L2 to the lane L1 at a vehicle speed vm1. For example, the contact likelihood determining unit 150, regarding a likelihood of there being contact between another vehicle m1 detected by the external system recognizing unit 110 and the subject vehicle M, for example, may estimate a predicted movement locus K1 of the subject vehicle M and a predicted movement locus K2 of another vehicle m1 and derive a time-to-collision (=relative distance/relative speed) using a relative distance and a relative speed between the subject vehicle M and another vehicle m1 moving along the estimated predicted movement loci. Then, the contact likelihood determining unit 150 compares the derived time-to-collision TTC with a predetermined determination threshold. The contact likelihood determining unit 150 determines that there is a likelihood of coming in contact in a case in which the time-to-collision is shorter than the threshold and determines that there is no likelihood of coming in contact in a case in which the time-to-collision is equal to or longer than the threshold. The contact likelihood determining unit 150 repeatedly determines a likelihood of there being contact between an obstacle and the subject vehicle M at a predetermined time intervals. The contact likelihood determining unit 150 may determine not only the likelihood of coming in contact with a merging vehicle described above but also a likelihood of coming in contact with a preceding vehicle running before the subject vehicle M, a pedestrian crossing in front of the subject vehicle M, or the like.

The driver state recognizing unit 160 recognizes a state of a driver of the subject vehicle M. For example, the driver state recognizing unit 160 extracts feature information of a face the driver from an image captured by the vehicle indoor camera 50 and recognizes a facial expression of the driver on the basis of the extracted feature information. Here, the feature information, for example, is information including positions of predetermined parts such as the eyes, eyebrows, the mouth, and the like and amounts of change thereof. A facial expression of a driver, for example, includes "surprise," "fear," "anger," "disgust," "sadness," and "happiness." For example, the driver state recognizing unit 160 may classify patterns of facial expressions into six patterns described above ("surprise," "fear," "anger," "disgust," "sadness," and "happiness") in advance and identifies a facial expression of the driver by collating the classified patterns of facial expressions with the feature information.

Then, the driver state recognizing unit 160 recognizes that the driver is in a predetermined state from the identified facial expression of the driver. Here, the predetermined state, for example, may be a driver's impatient state. The impatient state, for example, is a state in which a driver recognizes that there is a high likelihood of contact between an obstacle and the subject vehicle M or a driver state occurring in a case in which the behavior of the subject vehicle M becomes a behavior different from that intended according to an operation that is performed by a driver. For example, in a case in which the facial expression of a driver is an expression of "fear" when it is felt that there is a likelihood of a contact between an obstacle and the subject vehicle M or a facial expression of "surprise" at the time of an erroneous operation, the driver state recognizing unit 160 recognizes that the driver is in the impatient state. In a case in which the facial expression of the driver is not an expression of "fear" or "surprise," the driver state recognizing unit 160 may recognize that the driver is not in the impatient state.

Instead of (or in addition to) the facial expression described above, the driver state recognizing unit 160 may recognize that the state of a driver is in the impatient state on the basis of the biological information of the driver that is detected by the biological information detecting sensor 60. For example, in a case in which a heart rate detected by the heart beat sensor or the amount of change in the heart rate is equal to or larger than a threshold or in a case in which the amount of perspiration detected by the perspiration sensor is equal to or larger than a threshold, it may be recognized that the driver is in the impatient state. In a case in which the amount of change in the electric field detected by the myoelectric sensor or the amount of change in the bloodstream detected by the brain bloodstream sensor is equal to or larger than a threshold, it may be recognized that the driver is in the impatient state. In a case in which a brain wave detected by the brain wave sensor has a high degree of similarity (equal to or higher than a threshold) with a brain wave at the time of the impatient state, it may be recognized that the driver is in the impatient state. The driver state recognizing unit 160 can recognize the state of the driver with higher accuracy by combining a state recognition result based on the facial expression of the driver with a state recognition result based on the biological information detected by the biological information detecting sensor 60.

The driver state recognizing unit 160 may store learning data 182 acquired by learning a relation between a facial expression and biological information and a state of a driver for each driver through a statistical process, machine learning, or the like in the storage unit 180 in advance and recognize the state of the driver by collating a facial expression of the driver and a detection result acquired using the biological information detecting sensor with the learning data 182. In the learning data 182, learning data acquired by learning a relation between feature information and a facial expression for each driver may be included. In such a case, the driver state recognizing unit 160 can recognize a driver's facial expression with higher accuracy by collating feature information of the driver acquired from an image captured by the vehicle indoor camera 50 with the learning data 182.

The driver state recognizing unit 160 may acquire the learning data 182 from a server apparatus (not shown in the drawing) or the like through the communication device 20 and recognize the state of the driver that coincides with a driver's facial expression and a detection result acquired by the biological information detecting sensor by referring to the learning data stored in the server apparatus. In such a case, the state of each driver can be recognized with higher accuracy.

The drive support control unit 170, for example, includes a braking force control unit 172 and a stopping control unit 174. In a case in which it is determined by the contact likelihood determining unit 150 that there is a likelihood of a contact between the subject vehicle M and an obstacle, the braking force control unit 172 performs automated brake control of outputting a braking force by operating the brake device 210 to decelerate or stop the subject vehicle M or stopping the operation of the brake device 210 in accordance with stopping control using the stopping control unit 174 independently of a driver's operation on the brake pedal 84. The automated brake control according to an embodiment, for example, includes brake control for reducing damage due to a contact with an obstacle and brake control of inhibiting erroneous starting of the subject vehicle M. Details of the function of the braking force control unit 172 will be described later.

In a case in which an operation on the driving operator 80 is detected by the operation detecting unit 130 after a time that is a predetermined time before start of automated brake control, the stopping control unit 174 stops the automated brake control using the braking force control unit 172. In addition, in a case in which the state of the driver is recognized as being a predetermined state by the driver state recognizing unit 160, the stopping control unit 174 does not perform stopping of the automated brake control using the braking force control unit 172. Details of the function of the stopping control unit 174 will be described later.

The storage unit 180, for example, is realized by a nonvolatile storage device such as a read only memory (ROM), an electrically erasable and programmable read only memory (EEPROM), or an HDD and a volatile storage device such as a random access memory (RAM) or a register. In the storage unit 180, for example, the learning data 182 and other information is stored.

[Function of Braking Force Control Unit and Stopping Control Unit]

Next, details of the functions of the braking force control unit 172 and the stopping control unit 174 will be described. Hereinafter, mainly, details of automated brake control based on whether or not the state of a driver acquired by the driver state recognizing unit 160 is an impatient state or a timing at which the state is the impatient state will be divided into several patterns in description.

<First Control Pattern>

Figure 3:
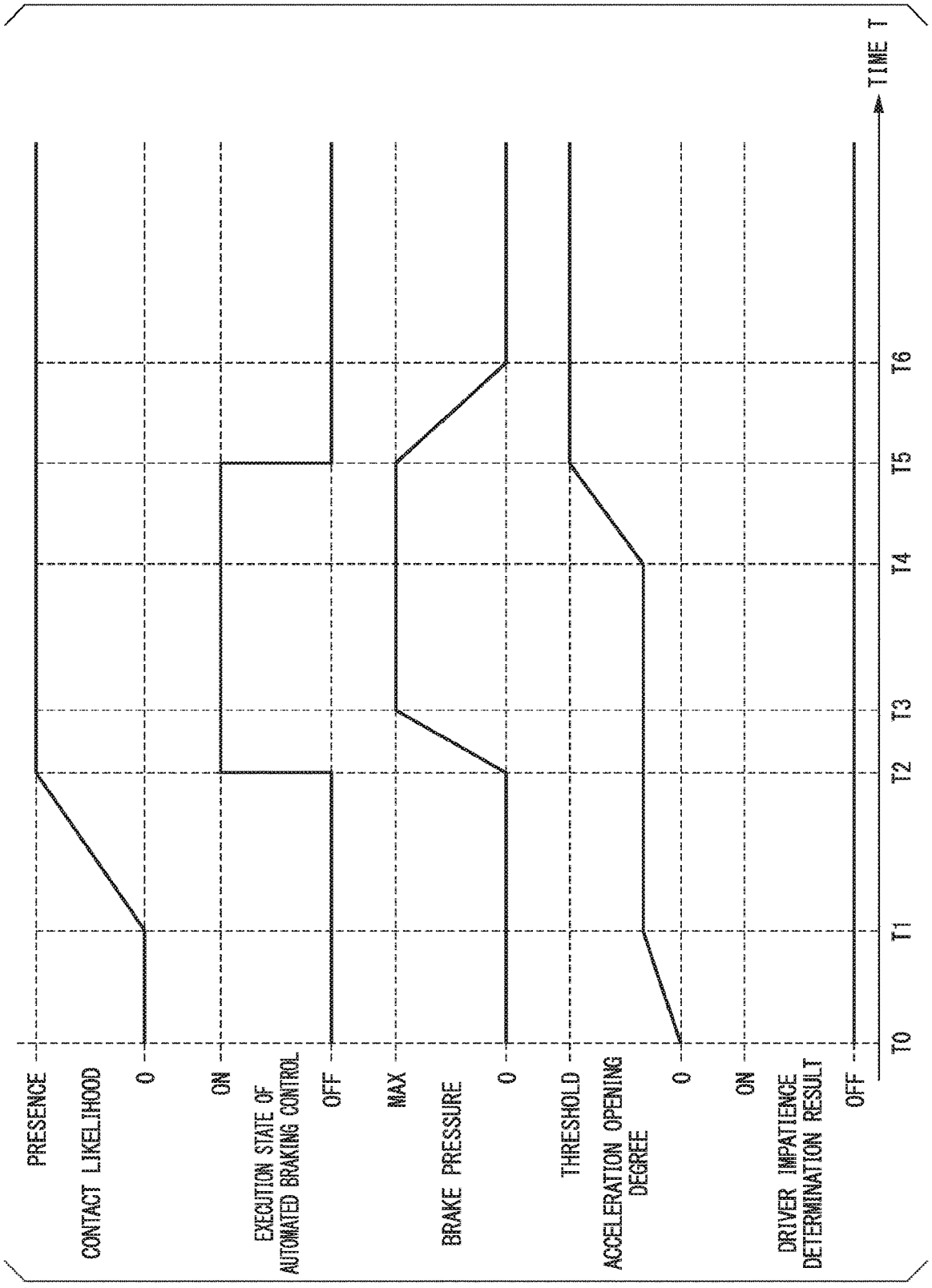
FIG. 3 is a diagram showing a first control pattern of automated brake control.

A first control pattern represents a control pattern in which automated brake control is executed before the acceleration opening degree becomes equal to or higher than a threshold in a case in which a driver is recognized as not being in an impatient state by the driver state recognizing unit 160. FIG. 3 is a diagram showing the first control pattern of the automated brake control. In the example shown in FIG. 3, the horizontal axis represents a time T, and the vertical axis represents a determination result acquired using the contact likelihood determining unit 150, an execution state (On or Off) of the automated brake control, a brake pressure applied to the brake device 210, an acceleration opening degree of the acceleration pedal 82, and a result (On or Off) of determination of impatience of a driver.

In the first control pattern, the running control unit 140 causes the subject vehicle M to run on the basis of a driver's acceleration operation less than a threshold from a time T0. After starting to run, the contact likelihood determining unit 150 determines a likelihood of a contact between the subject vehicle M and an obstacle object. Here, it is assumed that a likelihood of a contact with an obstacle gradually increases in a section of a time T1 to a time T2, and it is determined that there is a likelihood of a contact with the obstacle at the time T2. In such a case, the braking force control unit 172 starts automated brake control (an On state in the drawing) and increases a brake pressure of the brake device 210 for decelerating or stopping the subject vehicle M.

After a state in which the brake pressure has a maximum value (MAX) continues during a time T3 to a time T4, it is assumed that the acceleration opening degree becomes equal to or higher than a threshold at a time T5 in accordance with a driver's acceleration operation. In this case, the stopping control unit 174 causes the braking force control unit 172 to stop the automated brake control (an Off state in the drawing), performs control such that the brake pressure becomes "0" at a time T6, and then performs running control for an acceleration operation.

In this way, according to the first control pattern, in a case in which a driver is not in the impatient state, and the acceleration opening degree of the acceleration pedal 82 is lower than the threshold and in a case in which there is a likelihood of a contact between the subject vehicle M and an obstacle, automated brake control is started, and thereafter, in a case in which an acceleration operation is performed until the acceleration opening degree becomes equal to or higher than the threshold, the braking force control unit 172 can be caused to stop the automated brake control. According to the first control pattern, the driver is not in the impatient state and is performing an acceleration operation, and accordingly, it can be estimated that an erroneous operation has not been performed, and, as a result, appropriate drive control based on details of the operation can be executed.

<Second Control Pattern>

Figure 4:
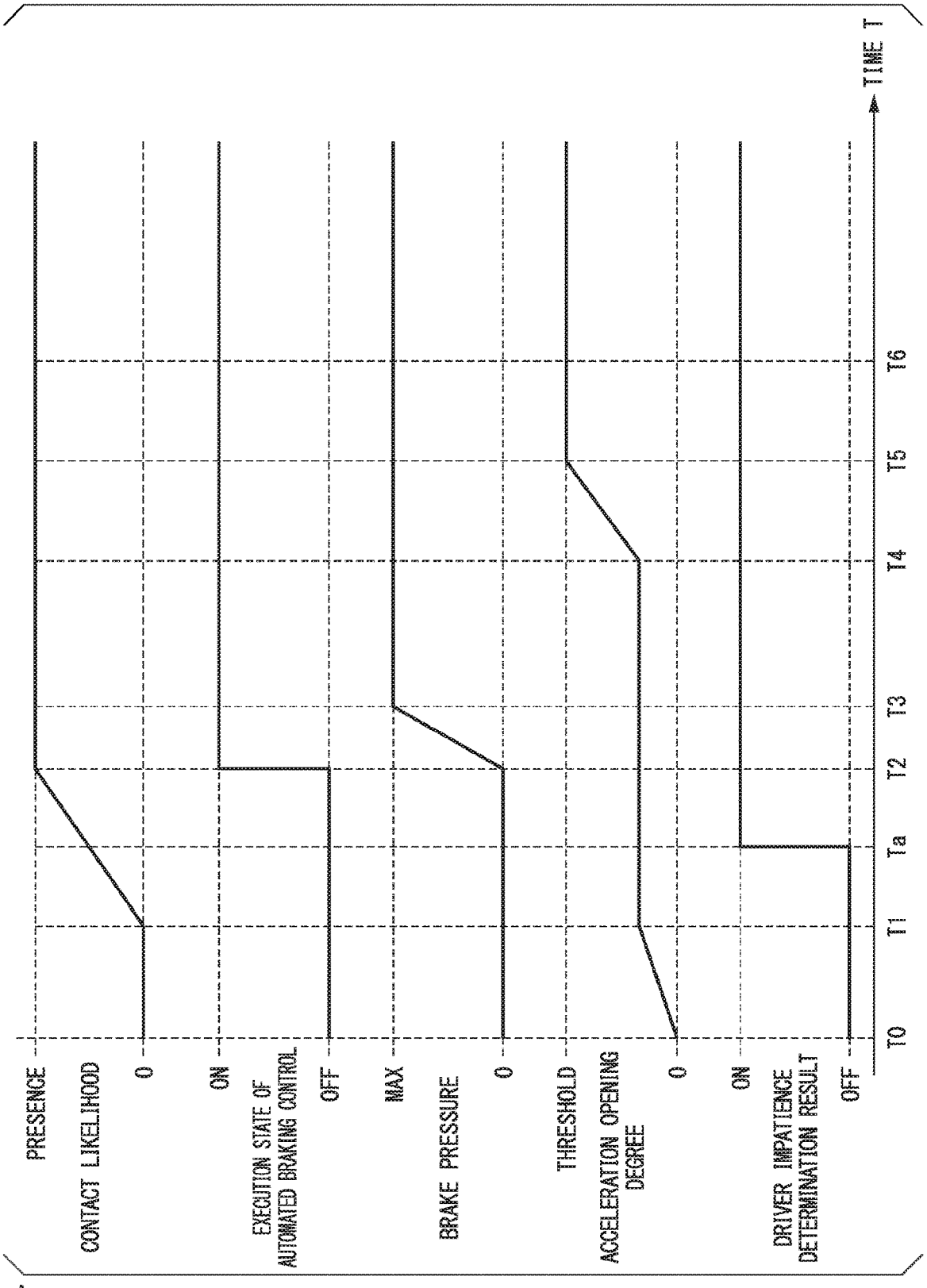
FIG. 4 is a diagram showing a second control pattern of automated brake control.

A second control pattern represents a control pattern in which automated brake control is executed before the acceleration opening degree becomes equal to or higher than a threshold in a case in which a driver is recognized as being in an impatient state by the driver state recognizing unit 160. FIG. 4 is a diagram showing the second control pattern of the automated brake control. In the example shown in FIG. 4, the horizontal axis and the vertical axis represent contents that are similar to those shown in FIG. 3. In the second control pattern shown in FIG. 4, in order to give description in comparison with the first control pattern, times T0 to T6 shown in FIG. 3 are represented. Hereinafter, mainly, parts different from those of the first control pattern will be focused in description. This similarly applies also to drawings showing subsequent control patterns.

In the second control pattern, the driver state recognizing unit 160 determines that a driver is in the impatient state (an On state in the drawing) a predetermined time before automated brake control is started by the braking force control unit 172 (a time Ta in the drawing). In this case, even in a case in which the acceleration opening degree according to a driver's acceleration operation becomes equal to or higher than the threshold at the time T5, the stopping control unit 174 does not perform stopping control of the automated brake control and continues a state in which a brake pressure for decelerating or stopping the subject vehicle M is applied. In this way, according to the second control pattern, automated brake control can be continued in a case in which it is estimated that an acceleration operation is erroneously performed on the basis of the state of the driver during driving (in other words, a case in which it is estimated that the acceleration pedal 82 is erroneously operated instead of the brake pedal 84) after start of the automated brake control.

<Third Control Pattern>

Figure 5:
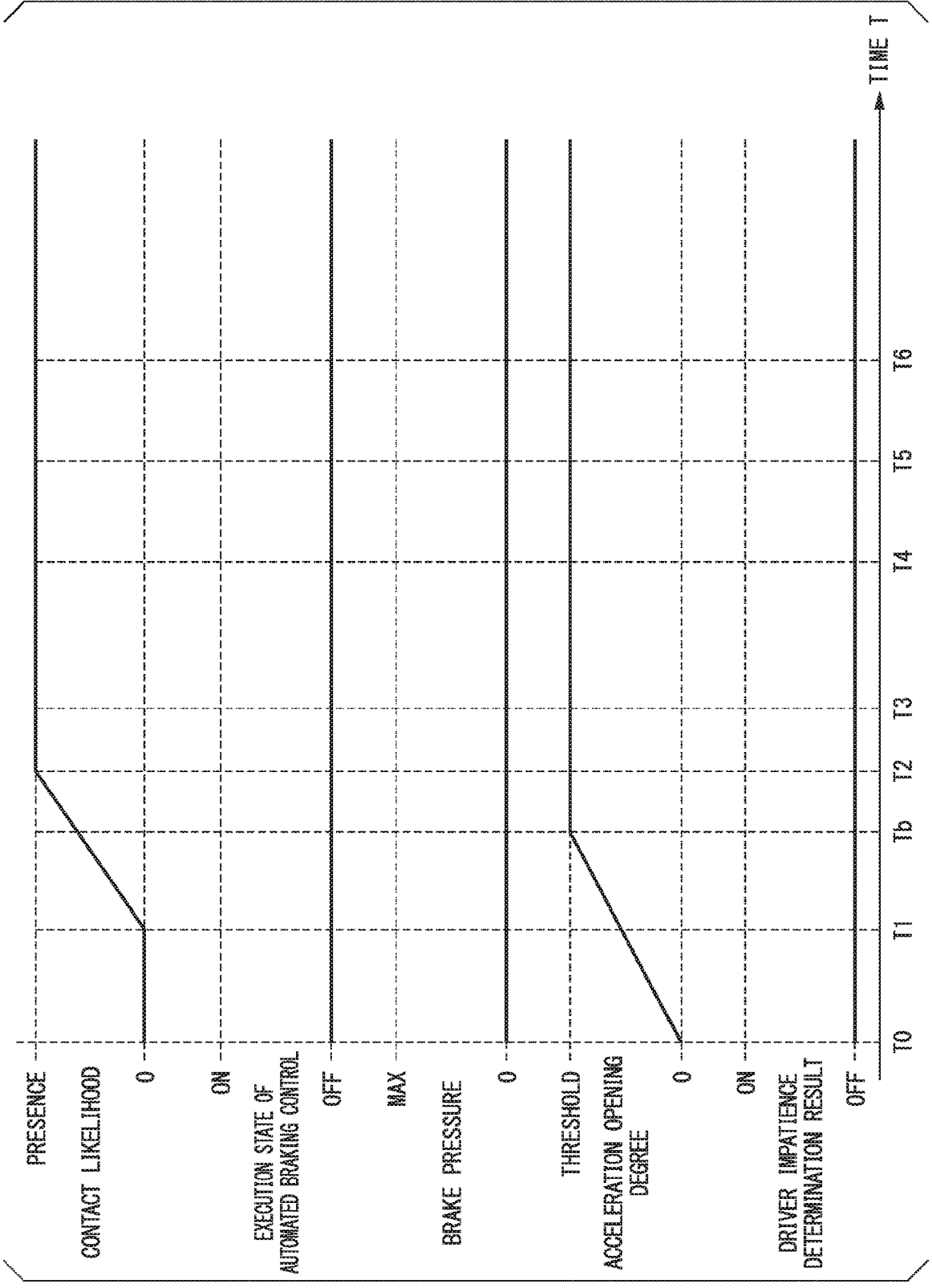
FIG. 5 is a diagram showing a third control pattern of automated brake control.

A third control pattern represents a control pattern of automated brake control in a case in which a driver is recognized as not being in an impatient state by the driver state recognizing unit 160, and the acceleration opening degree becomes equal to or higher than a threshold before it is determined by the contact likelihood determining unit 150 that there is a likelihood of a contact between the subject vehicle M and an obstacle. FIG. 5 is a diagram showing the third control pattern of the automated brake control.

In the third control pattern, the running control unit 140 causes the subject vehicle M to run on the basis of a driver's acceleration operation less than a threshold from a time T0. The contact likelihood determining unit 150 determines a likelihood of a contact between the subject vehicle M and an obstacle. Here, in the third control pattern, an acceleration opening degree becomes equal to or higher than a threshold at a timing (for example, a time Tb) that is a predetermined time before a time T2 at which it is determined that there is a likelihood of a contact. In this case, the stopping control unit 174 stops the automated brake control using the braking force control unit 172. For this reason, also at the time T2 and thereafter, automated brake control is not executed. In this way, according to the third control pattern, since the impatient state of a driver is not recognized, it can be estimated that a driver's acceleration operation is not an erroneous operation, and accordingly, more appropriate drive control can be executed.

<Fourth Control Pattern>

Figure 6:
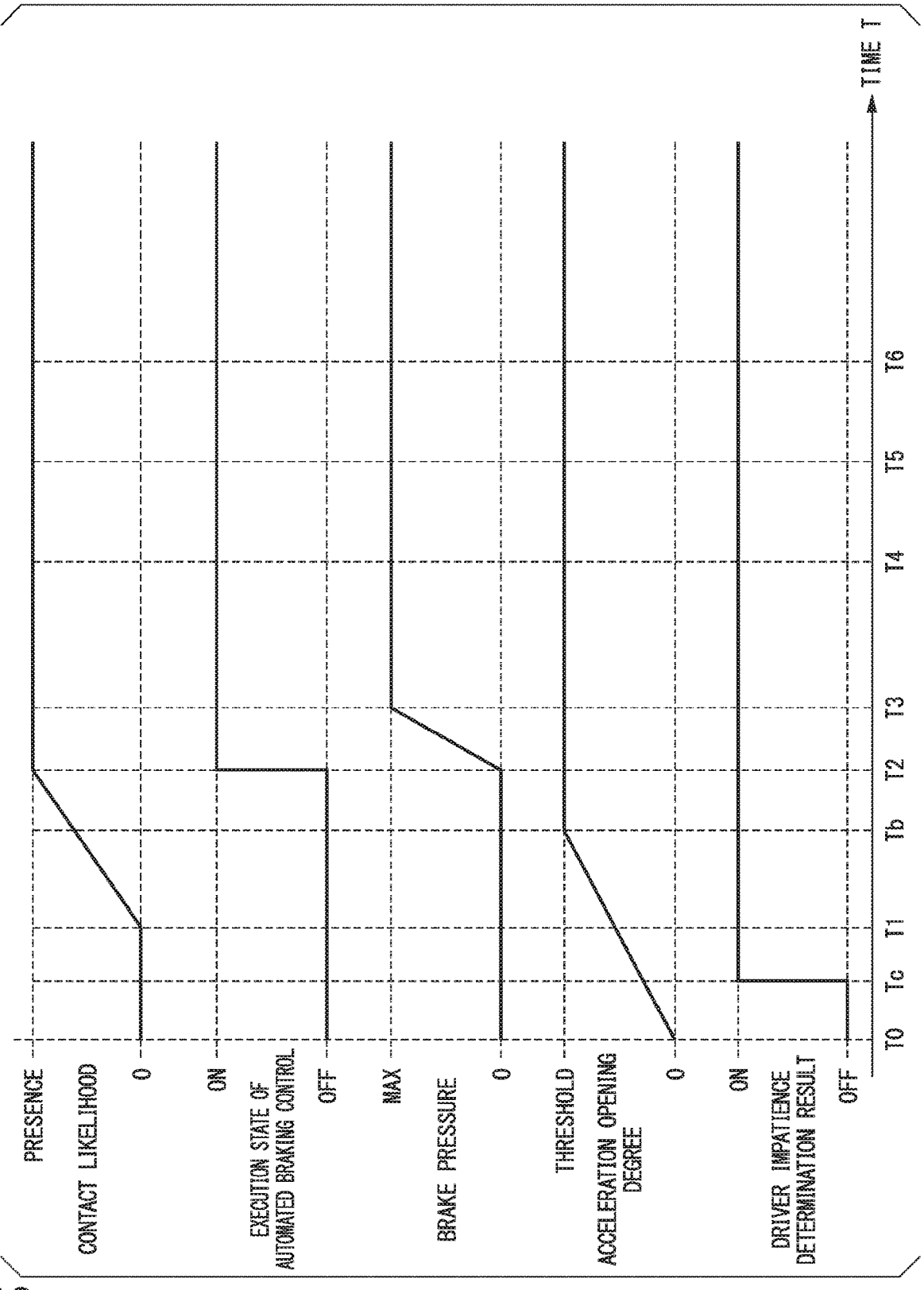
FIG. 6 is a diagram showing a fourth control pattern of automated brake control.

A fourth control pattern, in the third control pattern, represents a control pattern of automated brake control in a case in which it is recognized by the driver state recognizing unit 160 that a driver is in an impatient state at a timing that is a predetermined time before a time Tb at which an acceleration opening degree becomes equal to or higher than a threshold. FIG. 6 is a diagram showing the fourth control pattern of the automated brake control.

In the fourth control pattern, the driver state recognizing unit 160 recognizes that the driver is in the impatient state at a timing (for example, a time Tc) that is a predetermined time before a time Tb at which the acceleration opening degree becomes equal to or higher than the threshold. It is estimated that this impatient state is impatience that occurs due to an erroneous acceleration operation performed instead a braking operation. Accordingly, the braking force control unit 172 starts automated brake control at a timing of a time T2 at which it is determined by the contact likelihood determining unit 150 that there is a likelihood of a contact or a timing that is before the time T2 and performs control of increasing a brake pressure to a maximum value and decelerating or stopping the subject vehicle M. In this way, according to the fourth control pattern, by recognizing a driver's impatient state during driving, for example, in a case in which it is estimated that an acceleration operation is erroneously performed by the driver before start of automated brake control, automated brake control can be started.

<Fifth Control Pattern>

Figure 7:
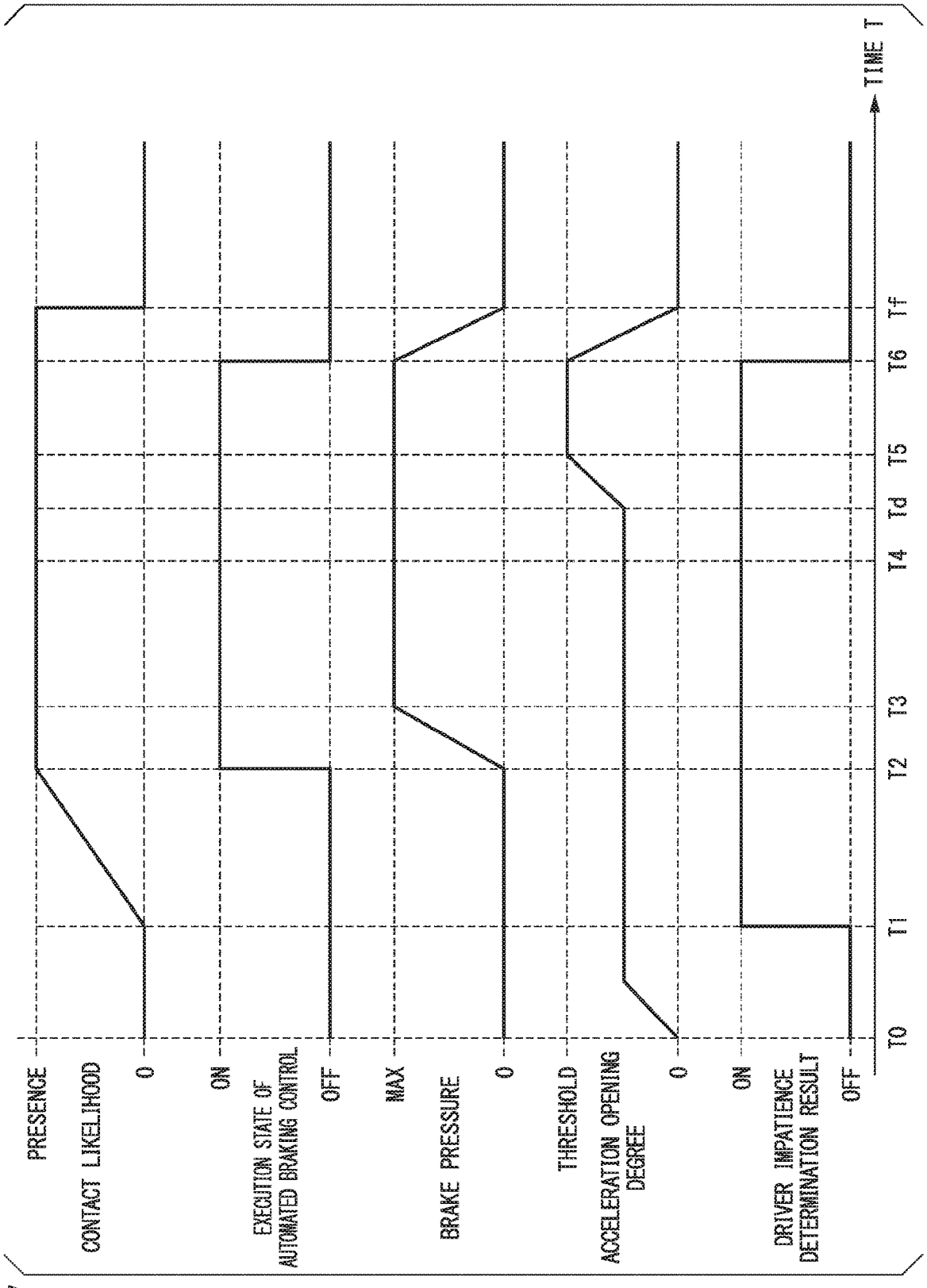
FIG. 7 is a diagram (1) showing a fifth control pattern of automated brake control.
Figure 8:
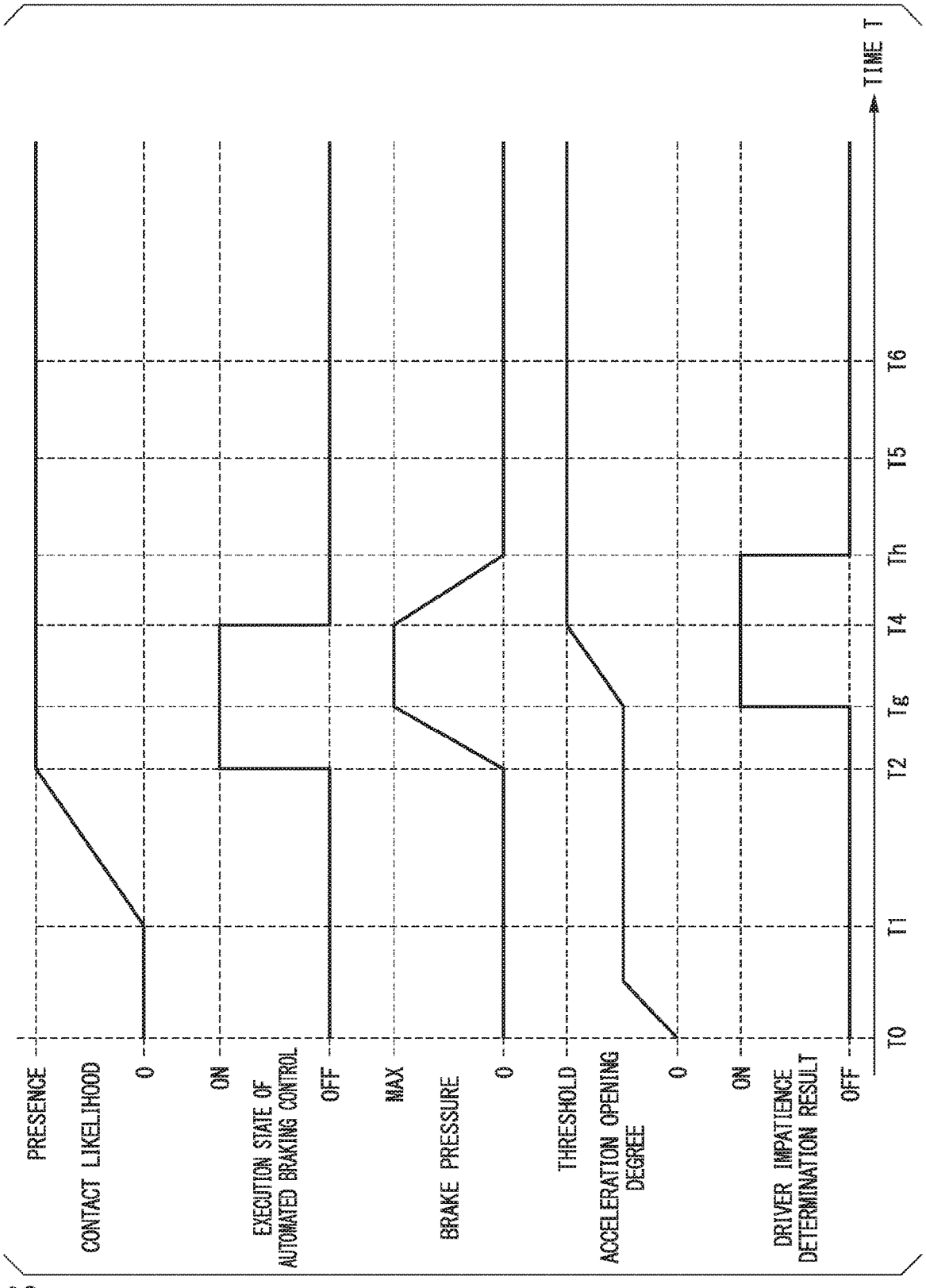
FIG. 8 is a diagram (2) showing the fifth control pattern of automated brake control.

A fifth control pattern represents a control pattern of automated brake control based on a timing at which a driver becomes an impatient state. FIGS. 7 and 8 are diagrams (1 and 2) showing the fifth control pattern of automated brake control. The example shown in FIG. 7 shows a case in which a driver's impatient state is determined by the driver state recognizing unit 160 before automated brake control is started using the braking force control unit 172. In a case in which it is determined by the contact likelihood determining unit 150 that there is a likelihood of a contact, the braking force control unit 172 increases a brake pressure up to a maximum value by operating automated brake control. Thereafter, in a case in which the acceleration opening degree increases in accordance with a driver's acceleration operation at a time Td, and the acceleration opening degree becomes equal to or higher than the threshold at a time T5, the stopping control unit 174 continues the automated brake control without performing control of stopping the automated brake control.

In the fifth control pattern, as shown in an example shown in FIG. 7, at a time T6, in a case in which it is recognized by the driver state recognizing unit 160 that the driver is not in the impatient state, and the acceleration opening degree according to a driver's acceleration operation becomes lower than the threshold, the stopping control unit 174 may perform control of stopping automated brake control using the braking force control unit 172 and setting the brake pressure to zero until a time Tf. In the example shown in FIG. 7, at the time Tf, the acceleration opening degree also becomes zero, and accordingly, the subject vehicle M stops at the time Tf. In the example shown in FIG. 7, a likelihood of a contact is zero at the time Tf.

In an example shown in FIG. 8, a case in which it is determined by the driver state recognizing unit 160 that a driver is in an impatient state at a time Tg in a state in which automated brake control is executed by the braking force control unit 172. In this case, since it is estimated that the driver comes into the impatient state according to unintended automated brake control, at a time T4, in a case in which the acceleration opening degree becomes equal to or higher than the threshold, the stopping control unit 174 sets the brake pressure to zero at a time Th by stopping the automated brake control using the braking force control unit 172. In the example shown in FIG. 8, at a time Th, it is recognized by the driver state recognizing unit 160 that the driver is not in the impatient state.

In this way, according to the fifth control pattern, more appropriate drive control can be executed on the basis of whether a timing at which the driver comes into the impatient state is before or after start of the automated brake control.

[Process Flow]

Figure 9:
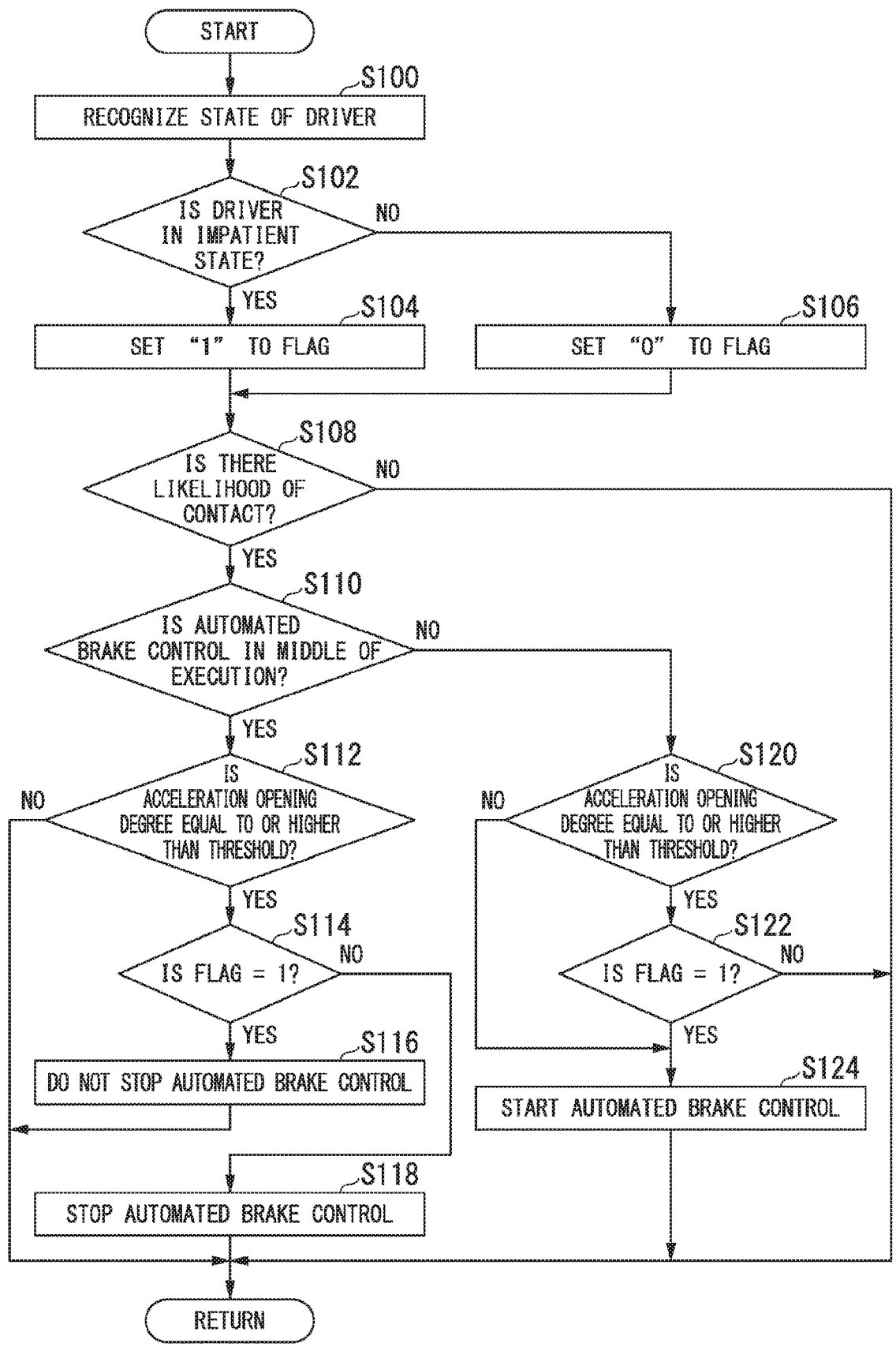
FIG. 9 is a flowchart showing the flow of a process executed by a drive control device according to an embodiment.

FIG. 9 is a flowchart showing the flow of a process executed by the drive control device 100 according to an embodiment. The process of this flowchart, for example, may be repeatedly executed at a predetermined period or predetermined timings. First, the driver state recognizing unit 160 recognizes a state of a driver on the basis of a facial expression or biological information of the driver (Step S100) and determines whether or not the recognized state of the driver is the impatient state (Step S102). In a case in which the impatient state is determined, the driver state recognizing unit 160 sets "1" to a flag representing the impatient state of the driver that is set in advance (Step S104). On the other hand, in a case in which no impatient state is determined, the driver state recognizing unit 160 sets "0" to the flag (Step S106).

Next, the contact likelihood determining unit 150 determines whether or not there is a likelihood of a contact between the subject vehicle M and an obstacle (Step S108). In a case in which it is determined that there is a likelihood of a contact between the subject vehicle M and an obstacle, the stopping control unit 174 determines whether or not automated brake control using the braking force control unit 172 is in the middle of execution (Step S110). In a case in which it is determined that the automated brake control is in the middle of execution, the running control unit 140 determines whether or not an acceleration opening degree according to a driver's acceleration operation is equal to or higher than a threshold (Step S112). In a case in which the acceleration opening degree is equal to or higher than the threshold, the stopping control unit 174 determines whether not the flag is "1" (Step S114). In a case in which the flag is "1," the stopping control unit 174 does not stop the automated brake control (Step S116). On the other hand, in a case in which the flag is not "1," the stopping control unit 174 stops the automated brake control that is in the middle of execution using the braking force control unit 172 (Step S118).

In the process of Step S110, in a case in which the automated brake control is not in the middle of execution, the running control unit 140 determines whether or not an acceleration opening degree according to a driver's acceleration operation is equal to or higher than the threshold (Step S120). In a case in which it is determined that the acceleration opening degree is equal to or higher than the threshold, the braking force control unit 172 determines whether or not the flag is "1" (Step S122). In a case in which it is determined that the flag is "1," in a case in which it is determined that the acceleration opening degree is not equal to or higher than the threshold in Step S120, the braking force control unit 172 starts automated brake control (Step S124). In this way, the process of this flowchart ends. In a case in which it is determined that there is no likelihood of a contact in the process of Step S108, in a case in which it is determined that the acceleration opening degree is not equal to or higher than the threshold in the process of Step S112 or in a case in which "1" is not set in the flag in the process of Step S122, the process of this flowchart ends.

Figure 10:
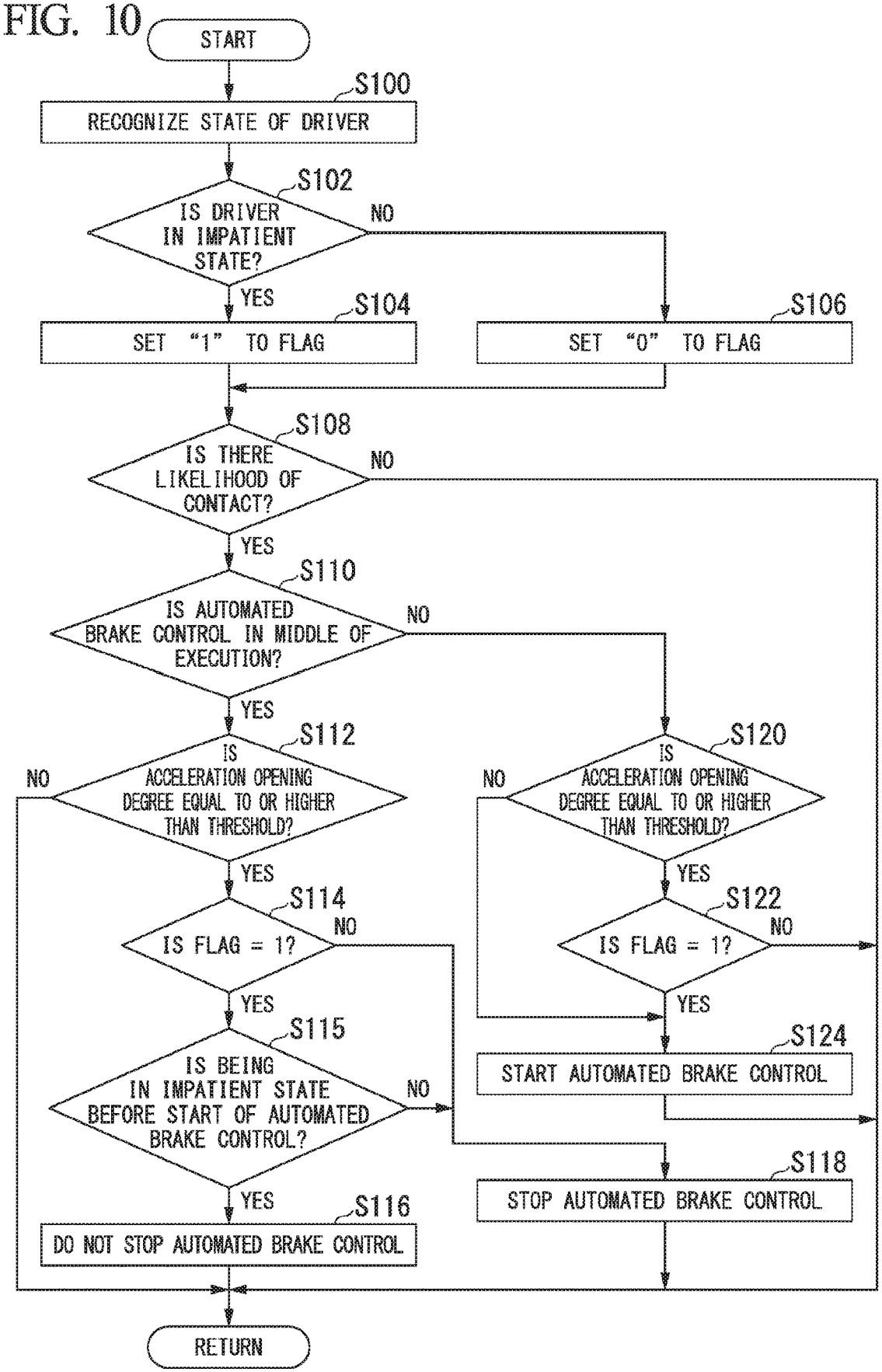
FIG. 10 is a flowchart showing the flow of an automated brake control process based on a timing at which a driver becomes an impatient state.

FIG. 10 is a flowchart showing the flow of an automated brake control process based on a timing at which a driver comes into the impatient state. Compared to the flowchart shown in FIG. 9, the flowchart shown in FIG. 10 has the process of Step S115 between Step S114 and Step S116. Accordingly, hereinafter, the process of Step S115 will be mainly described.

In the process of Step S114, in a case in which the flag is "1," the stopping control unit 174 determines whether or not the driver being in the impatient state is before start of the automated brake control (Step S115). In a case in which it is determined that the driver being in the impatient state is before start of the automated brake control, the stopping control unit 174 does not stop the automated brake control that is in the middle of execution (Step S116). In a case in which it is determined that the driver being in the impatient state is not before the start of the automated brake control, the stopping control unit 174 stops the automated brake control that is in the middle of execution using the braking force control unit 172 (Step S118).

According to the embodiment described above, the drive control device 100 can execute more appropriate drive control on the basis of surrounding situations and a driving operation of the driver. More specifically, according to this embodiment, by using not only a driver's acceleration operation but also the state of the driver, starting and stopping of the automated brake control such as a collision damage reducing brake and an erroneous start inhibiting brake can be controlled at a more appropriate timing.

According to this embodiment, by recognizing a driver's impatient state, it is estimated that the likelihood of a contact between the subject vehicle M and an obstacle increases, and execution and stopping of drive support can be controlled more appropriately.

Another Embodiment

The drive control described above, for example, can be applied also to automated driving vehicle. Here, the automated driving, for example, is driving the subject vehicle M by controlling one or both of steering and acceleration/deceleration of the subject vehicle M without depending on a driving operation performed by a vehicle occupant riding on the subject vehicle M. An automated driving vehicle can also be manually driven in accordance with a vehicle occupant's operation on the driving operator 80, and, for example, a vehicle occupant can switch from automated driving to manual driving by performing a predetermined operation on the driving operator 80 at the time of executing automated driving.

In such a case, for example, in a case in which it is determined by the contact likelihood determining unit 150 that there are cases in which the subject vehicle M and an obstacle are in contact with each other and in a case in which it is detected by the operation detecting unit 130 that a predetermined operation has been performed on the driving operator 80, the driver state recognizing unit 160 recognizes the state of the driver who has performed the driving operation and controls such that switching from automated driving to manual driving is not performed in a case in which it is determined that the state of the vehicle occupant is the impatient state. In this way, also in the automated driving vehicle, more appropriate drive control can be executed on the basis of surrounding situations and the state of the driver.

[Hardware Configuration]

Figure 11:
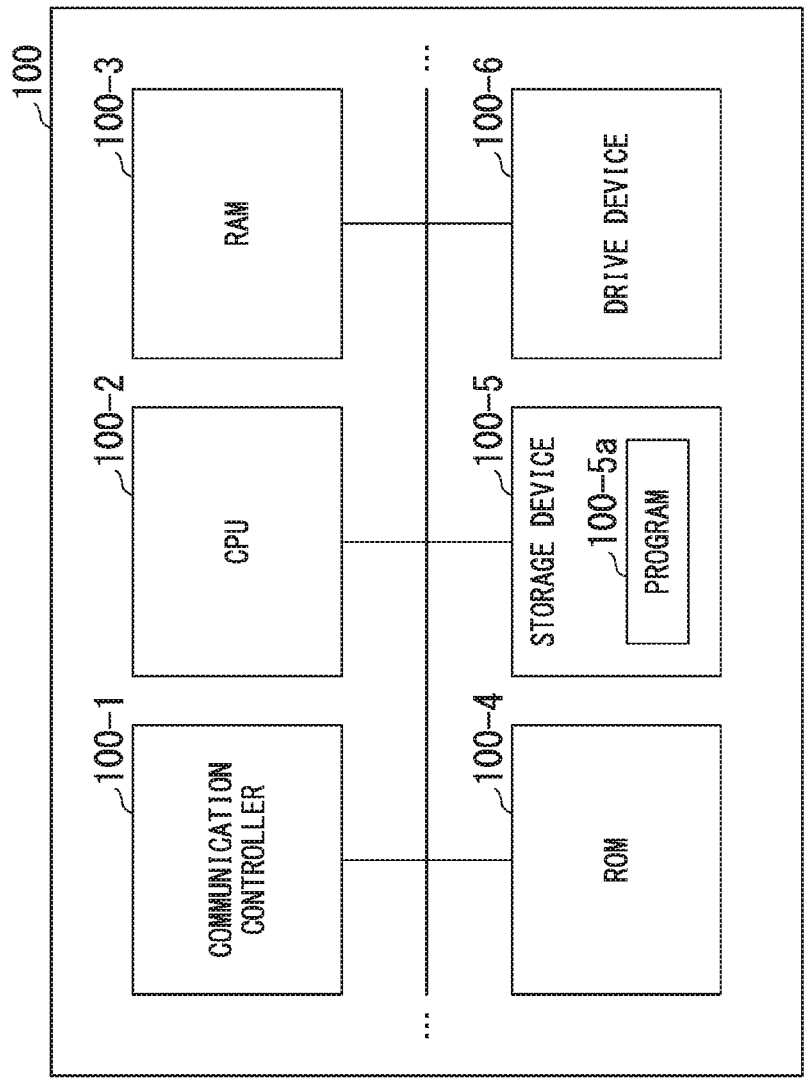
FIG. 11 is a diagram showing one example of the hardware configuration of a drive control device according to an embodiment.

FIG. 11 is a diagram showing one example of the hardware configuration of the automated drive control device 100 according to an embodiment. As shown in the drawing, the automated drive control device 100 has a configuration in which a communication controller 100-1, a CPU 100-2, a RAM 100-3 used as a working memory, a ROM 100-4 storing a boot program and the like, a storage device 100-5 such as a flash memory or an HDD, a drive device 100-6, and the like are interconnected through an internal bus or a dedicated communication line. The communication controller 100-1 communicates with constituent elements other than the drive control device 100. In the drive device 100-6, a portable-type storage medium (for example, a computer-readable non-transitory storage medium) such as an optical disc is loaded. A program 100-5$a$ executed by the CPU 100-2 is stored in the storage device 100-5. In addition, the program 100-5a referred to by the CPU 100-2 may be stored in a portable-type storage medium loaded in the drive device 100-6 or may be downloaded from another device through a network. This program is expanded in the RAM 100-3 using a direct memory access (DMA) controller (not shown in the drawing) or the like and is executed by the CPU 100-2. In this way, some or all of the external system recognizing unit 110, the subject vehicle position recognizing unit 120, the operation detecting unit 130, the running control unit 140, the contact likelihood determining unit 150, the driver state recognizing unit 160, the drive support control unit 170, and the storage unit 180 of the drive control device 100 are realized.

The embodiment described above can be represented as below.

A vehicle control device including a storage device storing a program and a hardware processor and configured such that the hardware processor, by executing the program stored in the storage device, recognizes an obstacle in the vicinity of a vehicle, recognizes a state of a driver of the vehicle, detects an operation of the driver on an operator accepting a driving operation for a driving force output device that can output a driving force used for running of the vehicle, performs automated brake control of outputting a braking force by operating a brake device that can output a braking force for the vehicle in a case in which a relation between the recognized obstacle and the vehicle satisfies a predetermined condition, and stops the automated brake control in a case in which a driving operation of a predetermined level or more using the operator is detected from a time that is a predetermined time before start of the automated brake control to a time at which the automated brake control starts and does not perform the stopping of the automated brake control in a case in which the state of the driver is recognized as a predetermined state.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising: an obstacle recognizing unit that recognizes an obstacle in the vicinity of a vehicle; a state recognizing unit that recognizes a state of a driver of the vehicle; an operation detecting unit that detects an operation of the driver on an operator accepting a driving operation for a driving force output device that outputs a driving force used for running of the vehicle; a braking force control unit that performs automated brake control of outputting a braking force by operating a brake device that outputs a braking force for the vehicle in a case in which a relation between the obstacle recognized by the obstacle recognizing unit and the vehicle satisfies a predetermined condition; and a stopping control unit that causes the braking force control unit to stop the automated brake control in a case in which a driving operation of a predetermined level or more using the operator is detected by the operation detecting unit from a time that is a predetermined time before start of the automated brake control using the braking force control unit to a time at which the automated brake control starts, wherein the stopping control unit does not perform the stopping of the automated brake control in a case in which the state of the driver is recognized as a predetermined state by the state recognizing unit.

2. The vehicle control device according to claim 1, wherein the stopping control unit causes the braking force control unit to stop the automated brake control in a case in which a driving operation of a predetermined level or more using the operator is detected by the operation detecting unit after the automated brake control is started by the braking force control unit.

3. The vehicle control device according to claim 1, wherein the stopping control unit does not perform the stopping of the automated brake control in a case in which the state of the driver is recognized as a predetermined state by the state recognizing unit before the automated brake control is started and in a case in which a driving operation of a predetermined level or more using the operator is detected by the operation detecting unit after the automated brake control is started.

4. The vehicle control device according to claim 1, wherein the stopping control unit causes the braking force control unit to stop the automated brake control in a case in which the state of the driver is recognized as a predetermined state by the state recognizing unit after the automated brake control is started, and a driving operation of a predetermined level or more using the operator is detected by the operation detecting unit.

5. The vehicle control device according to claim 1, further comprising a driver imaging unit that images the driver,
wherein the state recognizer recognizes a facial expression of the driver from an image captured by the driver imaging unit and recognizes the state of the driver on the basis of the recognized facial expression.

6. The vehicle control device according to claim 5, wherein the state recognizing unit classifies patterns of facial expressions recognized using images captured by the driver imaging unit and recognizes the state of the driver on the basis of the classified patterns of the facial expressions.

7. The vehicle control device according to claim 5, further comprising a storage unit that stores learning data associating a facial expression and a state with each other for each driver,
wherein the state recognizing unit identifies a driver of the vehicle from images captured by the driver imaging unit and recognizes a state of the identified driver by collating a facial expression of the identified driver with the learning data stored in the storage unit.

8. The vehicle control device according to claim 1, further comprising a biological information detecting unit that detects biological information of the driver,
wherein the state recognizing unit recognizes the state of the driver on the basis of the biological information detected by the biological information detecting unit.

9. A vehicle control device comprising: an obstacle recognizing unit that recognizes an obstacle in the vicinity of a vehicle; a state recognizing unit that recognizes a state of a driver of the vehicle; an operation detecting unit that detects an operation of the driver on an operator accepting a driving operation for a driving force output device that outputs a driving force used for running of the vehicle; a braking force control unit that performs automated brake control of outputting a braking force by operating a brake device that outputs a braking force for the vehicle in a case in which a relation between the obstacle recognized by the obstacle recognizing unit and the vehicle satisfies a predetermined condition; and a stopping control unit that causes the braking force control unit to stop the automated brake control in a case in which a driving operation of a predetermined level or more using the operator is detected by the operation detecting unit from a time that is a predetermined time before start of the automated brake control using the braking force control unit to a time at which the automated brake control starts, wherein the stopping control unit stops the automated brake control in a case in which the state of the driver is not recognized as a predetermined state by the state recognizing unit.

10. The vehicle control device according to claim 9, wherein the stopping control unit causes the braking force control unit to stop the automated brake control in a case in which a driving operation of a predetermined level or more using the operator is detected by the operation detecting unit after the automated brake control is started by the braking force control unit.

11. The vehicle control device according to claim 9, wherein the stopping control unit does not perform the stopping of the automated brake control in a case in which the state of the driver is recognized as a predetermined state by the state recognizing unit before the automated brake control is started and in a case in which a driving operation of a predetermined level or more using the operator is detected by the operation detecting unit after the automated brake control is started.

12. The vehicle control device according to claim 9, wherein the stopping control unit causes the braking force control unit to stop the automated brake control in a case in which the state of the driver is recognized as a predetermined state by the state recognizing unit after the automated brake control is started, and a driving operation of a predetermined level or more using the operator is detected by the operation detecting unit.

13. The vehicle control device according to claim 9, further comprising a driver imaging unit that images the driver,
wherein the state recognizer recognizes a facial expression of the driver from an image captured by the driver imaging unit and recognizes the state of the driver on the basis of the recognized facial expression.

14. The vehicle control device according to claim 13, wherein the state recognizing unit classifies patterns of facial expressions recognized using images captured by the driver imaging unit and recognizes the state of the driver on the basis of the classified patterns of the facial expressions.

15. The vehicle control device according to claim 13, further comprising a storage unit that stores learning data associating a facial expression and a state with each other for each driver,
wherein the state recognizing unit identifies a driver of the vehicle from images captured by the driver imaging unit and recognizes a state of the identified driver by collating a facial expression of the identified driver with the learning data stored in the storage unit.

16. The vehicle control device according to claim 9, further comprising a biological information detecting unit that detects biological information of the driver,
wherein the state recognizing unit recognizes the state of the driver on the basis of the biological information detected by the biological information detecting unit.

17. A vehicle control method using a vehicle control device, the vehicle control method comprising: recognizing an obstacle in the vicinity of a vehicle; recognizing a state of a driver of the vehicle; detecting an operation of the driver on an operator accepting a driving operation for a driving force output device that outputs a driving force used for running of the vehicle; performing automated brake control of outputting a braking force by operating a brake device that outputs a braking force for the vehicle in a case in which a relation between the recognized obstacle and the vehicle satisfies a predetermined condition; and stopping the automated brake control in a case in which a driving operation of a predetermined level or more using the operator is detected from a time that is a predetermined time before start of the automated brake control to a time at which the automated brake control starts and not performing the stopping of the automated brake control in a case in which the state of the driver is recognized as a predetermined state.

18. A computer-readable non-transitory storage medium having instructions stored thereon, the instructions upon execution by a processor causing a vehicle control device to execute: recognizing an obstacle in the vicinity of a vehicle; recognizing a state of a driver of the vehicle; detecting an operation of the driver on an operator accepting a driving operation for a driving force output device that outputs a driving force used for running of the vehicle; performing automated brake control of outputting a braking force by operating a brake device that outputs a braking force for the vehicle in a case in which a relation between the recognized obstacle and the vehicle satisfies a predetermined condition; and stopping the automated brake control in a case in which a driving operation of a predetermined level or more using the operator is detected from a time that is a predetermined time before start of the automated brake control to a time at which the automated brake control starts and not performing the stopping of the automated brake control in a case in which the state of the driver is recognized as a predetermined state.

* * * * *